(12) United States Patent
Essiambre et al.

(10) Patent No.: US 8,897,655 B2
(45) Date of Patent: Nov. 25, 2014

(54) ADAPTIVE CONSTELLATIONS AND DECISION REGIONS FOR AN OPTICAL TRANSPORT SYSTEM

(75) Inventors: René-Jean Essiambre, Red Bank, NJ (US); Chongjin Xie, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 152 days.

(21) Appl. No.: 13/525,936

(22) Filed: Jun. 18, 2012

(65) Prior Publication Data

US 2013/0336649 A1    Dec. 19, 2013

(51) Int. Cl.
 H04B 10/00  (2013.01)
 H04B 10/06  (2006.01)
 H04L 5/12   (2006.01)
 H04L 23/02  (2006.01)

(52) U.S. Cl.
 USPC ............ 398/202; 398/162; 398/209; 375/261

(58) Field of Classification Search
 CPC . H04L 5/006; H04L 27/38; H04L 2025/0342; H04B 10/2543
 USPC .............................. 398/32, 162, 195, 202, 209
 See application file for complete search history.

(56) References Cited

U.S. PATENT DOCUMENTS

| | | | |
|---|---|---|---|
| 6,249,180 B1 | 6/2001 | Maalej et al. | |
| 7,197,090 B1* | 3/2007 | Berger et al. | 375/317 |
| 7,352,832 B1* | 4/2008 | Lewis et al. | 375/345 |
| 7,986,878 B2 | 7/2011 | Saunders et al. | |
| 2003/0147655 A1* | 8/2003 | Shattil | 398/182 |
| 2004/0042802 A1* | 3/2004 | Ho et al. | 398/208 |
| 2009/0196602 A1* | 8/2009 | Saunders et al. | 398/26 |
| 2010/0158521 A1 | 6/2010 | Doerr et al. | |
| 2010/0272195 A1* | 10/2010 | Rao et al. | 375/260 |
| 2011/0038631 A1 | 2/2011 | Doerr | |
| 2011/0069749 A1* | 3/2011 | Forrester et al. | 375/232 |

FOREIGN PATENT DOCUMENTS

WO    2010107439 A1    9/2010

OTHER PUBLICATIONS

Essiambre, René-Jean, et al., "Capacity Limits of Optical Fiber Networks," Journal of Lightwave Technology, vol. 28, No. 4, Feb. 15, 2010, pp. 662-701.

(Continued)

*Primary Examiner* — David Payne
*Assistant Examiner* — Casey Kretzer
(74) *Attorney, Agent, or Firm* — Mendelsohn, Drucker & Dunleavy, P.C.; Yuri Gruzdkov; Steve Mendelsohn (57) ABSTRACT

An optical transport system in which (i) an optical transmitter is configured to adaptively change an operative constellation to use a constellation that provides optimal performance characteristics for the present optical-link conditions and/or (ii) an optical receiver is configured to change shapes of the decision regions corresponding to an operative constellation to adapt them to the type of signal distortions experienced by a transmitted optical signal in the optical link between the transmitter and receiver. Under some optical-link conditions, the optical receiver might use a decision-region configuration in which a decision region corresponding to a first constellation point includes an area that is closer in distance to a different second constellation point than to the first constellation point.

13 Claims, 6 Drawing Sheets
(2 of 6 Drawing Sheet(s) Filed in Color)

(56) References Cited

OTHER PUBLICATIONS

Li, Yang et al., "Design of Signal Constellations in the Presence of Phase Noise," IEEE 68th Vehicular Technology Conference, 2008, pp. 1-5.

Pfau, Timo J., "Noise-Resilient Constellations for an Optical Transport System," U.S. Appl. No. 131/347,072, filed Jan. 10, 2012.

Foschini, G. J., et al., "Optimization of Two-Dimension Signal Constellations in the Presence of Gaussian Noise," IEEE Transaction of Communications, vol. Com-22, No. 1, Jan. 1974, pp. 28-38.

Liu, X., "Novel Asterisk 16QAM Constellation for COFDM," IEEE Communications Letters, vol. 14, No. 7, Jul. 2010, pp. 596-598.

* cited by examiner

ADAPTIVE CONSTELLATIONS AND DECISION REGIONS FOR AN OPTICAL TRANSPORT SYSTEM

BACKGROUND

1. Field

The invention relates to optical communication equipment and, more specifically but not exclusively, to adaptive constellations that can be used to encode data at a transmitter and adaptive decision regions that can be used to decode the corresponding noise-impaired optical data signals at a receiver.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Transmission of optical communication signals over fiber-optic links is usually impaired by a significant amount of noise, such as additive white Gaussian noise (AWGN) and nonlinear noise. The noise distorts optical communication signals en route from the transmitter to the receiver in a manner that tends to detrimentally affect the bit-error rate (BER), the symbol-error rate (SER), and/or the maximum achievable transmission distance. Therefore, development of modulation/demodulation schemes that can help to mitigate the detrimental effects of optical noise is highly desirable.

SUMMARY

Disclosed herein are various embodiments of an optical transport system in some of which (i) an optical transmitter is configured to adaptively change an operative constellation to use a constellation that provides optimal performance characteristics for the present optical-link conditions and/or (ii) an optical receiver is configured to change shapes of the decision regions corresponding to an operative constellation to adapt them to the type of signal distortions experienced by a transmitted optical signal in the optical link between the transmitter and receiver. Under some optical-link conditions, the optical receiver might use a decision-region configuration in which a decision region corresponding to a first constellation point includes an area that is closer in distance to a different second constellation point than to the first constellation point.

According to one embodiment, provided is an apparatus comprising an optical receiver configured to decode an optical input signal using a constellation. The constellation comprises at least a first constellation point and a second constellation point. The optical receiver is further configured to: decode a symbol received via the optical input signal using the first constellation point if the symbol falls within a first decision region; and decode a symbol received via the optical input signal using the second constellation point if the symbol falls within a second decision region. The first decision region includes an area that is closer in distance to the second constellation point than to the first constellation point.

In some embodiments of the above apparatus, the second decision region includes an area that is closer in distance to the first constellation point than to the second constellation point.

In some embodiments of any of the above apparatus, the optical receiver is further configured to adaptively change a shape of at least one of the first and second decision regions based on detected changes in input-signal distortions.

In some embodiments of any of the above apparatus, the optical receiver is further configured to: measure a probability density function corresponding to the constellation based on a sequence of symbols received via the optical input signal; and define a shape of at least one of the first and second decision regions based on the probability density function.

According to another embodiment, provided is an apparatus comprising an optical receiver configured to: (i) decode symbols received via an optical input signal using a plurality of decision regions corresponding to a plurality of constellation points of a first constellation, wherein a received symbol is decoded using a first constellation point of the first constellation if the symbol falls within a decision region corresponding to the first constellation point; and (ii) change a shape of at least one of the decision regions.

In some embodiments of the above apparatus, the optical receiver is further configured to decode symbols received via the optical input signal using a decision region having a shape that has been changed.

In some embodiments of any of the above apparatus, the optical receiver is configured to change the shape of at least one of the decision regions based on detected changes in input-signal distortions.

In some embodiments of any of the above apparatus, the optical receiver is further configured to: measure a probability density function corresponding to the first constellation based on a sequence of symbols received via the optical input signal; and change the shape of the at least one of the decision regions based on the probability density function.

In some embodiments of any of the above apparatus, the optical receiver is configured to define the shape of the at least one of the decision regions based on a thalweg of the probability density function.

In some embodiments of any of the above apparatus, said sequence of symbols carries payload data.

In some embodiments of any of the above apparatus, said sequence of symbols is a pilot sequence.

In some embodiments of any of the above apparatus, the optical receiver is further configured to generate a feedback signal for an optical transmitter that caused the optical receiver to receive the optical input signal, said feedback signal having one or more performance metrics that characterize signal transmission from the optical transmitter to the optical receiver.

In some embodiments of any of the above apparatus, the one or more performance metrics include a bit-error rate or a symbol-error rate corresponding to the optical input signal.

In some embodiments of any of the above apparatus, the apparatus further comprises the optical transmitter, wherein the optical transmitter is configured to change the first constellation based on the feedback signal.

In some embodiments of any of the above apparatus, the optical transmitter is configured to change the first constellation by replacing it by a second constellation retrieved from a memory.

In some embodiments of any of the above apparatus, the optical transmitter is configured to change the first constellation by moving one or more of the constellation points with respect to each other.

According to yet another embodiment, provided is an apparatus comprising an optical transmitter configured to: (i) generate an optical output signal in response to a data sequence and based on a first constellation; (ii) receive a feedback signal from an optical receiver of the optical output signal, said feedback signal having one or more performance metrics that characterize signal transmission from the optical transmitter to the optical receiver; and (iii) change the first constellation based on the feedback signal.

In some embodiments of the above apparatus, the optical transmitter is configured to change the first constellation by replacing it by a second constellation retrieved from a memory.

In some embodiments of any of the above apparatus, the optical transmitter is configured to change the first constellation by moving one or more of its constellation points with respect to each other.

In some embodiments of any of the above apparatus, the optical transmitter is further configured to optimize the one or more performance metrics by iteratively changing constellations based on the feedback signal.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects, features, and benefits of different embodiments of the disclosure will become more fully apparent, by way of example, from the following detailed description and the accompanying drawings, in which.

DETAILED DESCRIPTION

Various embodiments disclosed herein seek to provide optical modulation and/or demodulation schemes that can provide better performance characteristics for data transmission over noise-impaired optical channels than comparable prior-art schemes. Some embodiments disclosed herein provide customized constellations and symbol-mapping schemes, support the use of constellation symbols having substantially any amplitude levels and/or phase angles, and may be enabled with DAC (digital-to-analog converter) and ADC (analog-to-digital converter) technologies, which, due to recent advances, now offer a relatively high digital-signal resolution and a relatively high sampling rates.

Figure 1:
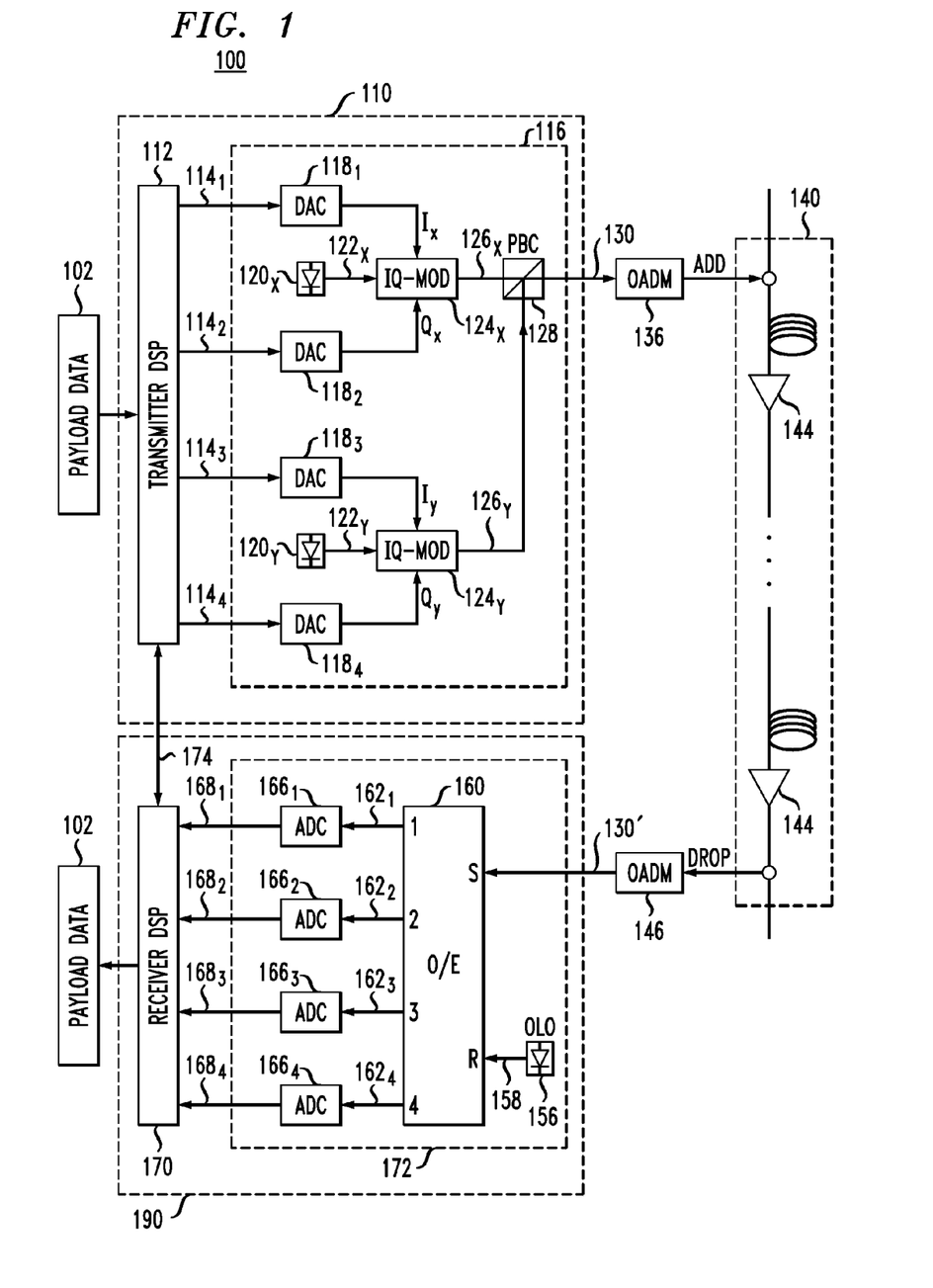
FIG. 1 shows a block diagram of an optical transport system in which various embodiments of the disclosure can be practiced.

FIG. 1 shows a block diagram of an optical transport system 100 in which various embodiments of the disclosure can be practiced. System 100 has an optical transmitter 110 that is configured to generate optical data-carrying symbols and apply a resulting optical output signal 130 to an optical transport link 140. System 100 also has an optical receiver 190 that is configured to appropriately process a corresponding optical input signal 130' received via optical transport link 140 from transmitter 110 to recover the corresponding original data.

Note that optical transport link 140 transforms signal 130 into signal 130' by imposing various signal distortions including, inter alia, AWGN and nonlinear noise. Both transmitter 110 and receiver 190 rely on the same selected constellation in the processes of encoding data and decoding the corresponding received optical symbols, respectively.

Transmitter 110 receives a digital (electrical) input stream 102 of payload data and applies it to a digital signal processor (DSP) 112. Processor 112 processes input stream 102 to generate digital signals $114_1$-$114_4$. More specifically, in each signaling interval (time slot), signals $114_1$ and $114_2$ carry digital values that represent the in-phase (I) component and quadrature (Q) component, respectively, of a corresponding constellation symbol intended for transmission using X-polarized light. Signals $114_3$ and $114_4$ similarly carry digital values that represent the I and Q components, respectively, of the corresponding constellation symbol intended for transmission using Y-polarized light, where the Y-polarization is orthogonal to the X-polarization.

An electrical-to-optical (E/O) converter (also sometimes referred to as a front end) 116 of transmitter 110 transforms digital signals $114_1$-$114_4$ into modulated optical output signal 130. More specifically, digital-to-analog converters (DACs) $118_1$ and $118_2$ transform digital signals $114_1$ and $114_2$ into an analog form to generate drive signals $I_x$ and $Q_x$, respectively. Drive signals $I_x$ and $Q_x$ are then used, in a conventional manner, to drive an I-Q modulator $124_X$. Based on drive signals $I_x$ and $Q_x$, I-Q modulator $124_X$ modulates an X-polarized beam $122_X$ of light supplied by a laser source $120_X$, thereby generating a modulated optical signal $126_X$.

DACs $118_3$ and $118_4$ similarly transform digital signals $114_3$ and $114_4$ into an analog form to generate drive signals $I_y$ and $Q_y$, respectively. Based on drive signals $I_y$ and $Q_y$, an I-Q modulator $124_Y$ modulates a Y-polarized beam $122_Y$ of light supplied by a laser source $120_Y$, thereby generating a modulated optical signal $126_Y$.

In an alternative embodiment, laser sources $120_X$ and $120_Y$ can be replaced by a single laser source coupled to an optical splitter so that (i) an output port of the optical splitter that outputs X-polarized light is configured to provide X-polarized beam $122_X$ and (ii) an output port of the optical splitter that outputs Y-polarized light is configured to provide Y-polarized beam $122_Y$.

A polarization beam combiner 128 combines modulated optical signals $126_X$ and $126_Y$ to generate optical output signal 130.

Optical output signal 130 is optionally applied to an optical add-drop multiplexer (OADM) 136 configured to add this signal, as known in the art, to other optical signals that are being transported via optical transport link 140.

Link 140 is illustratively shown as being an amplified link having a plurality of optical amplifiers 144 configured to amplify the optical signals that are being transported through the link, e.g., to counteract signal attenuation. Note that an optical link that has only one or even no optical amplifiers can alternatively be used as well. After propagating the intended length of link 140, optical signal 130 is transformed into optical signal 130', which is dropped from the link optionally via another optical add-drop multiplexer, OADM 146, and directed to receiver 190 for processing.

Receiver 190 has a front-end circuit 172 comprising an optical-to-electrical (O/E) converter 160, four analog-to-digital converters (ADCs) $166_1$-$166_4$, and an optical local oscillator (OLO) 156. O/E converter 160 has (i) two input ports labeled S and R and (ii) four output ports labeled 1 through 4. Input port S receives optical signal 130'. Input port R receives an optical reference signal 158 generated by OLO 156. Reference signal 158 has an optical-carrier frequency (wavelength) that is sufficiently close to that of signal 130' to enable homodyne or intradyne detection of the latter signal. Reference signal 158 can be generated, e.g., using a tunable laser controlled by a wavelength-control loop (not explicitly shown in FIG. 1) that forces the output wavelength of the tunable laser to closely track the carrier wavelength of signal 130'.

O/E converter 160 operates to mix input signal 130' and reference signal 158 to generate eight mixed optical signals (not explicitly shown in FIG. 1). O/E converter 160 then converts the eight mixed optical signals into four electrical signals $162_1$-$162_4$ that are indicative of complex values corresponding to the two orthogonal-polarization components of signal 130'. For example, electrical signals $162_1$ and $162_2$ may be an analog in-phase signal and an analog quadrature signal, respectively, corresponding to the X-polarization component of signal 130'. Electrical signals $162_3$ and $162_4$ may similarly be an analog in-phase signal and an analog quadrature signal, respectively, corresponding to the Y-polarization component of signal 130'.

In one embodiment, O/E converter 160 is a polarization-diverse 90-degree optical hybrid (PDOH) with four balanced photo-detectors coupled to its eight output ports. Various suitable PDOHs are commercially available, e.g., from Optoplex Corporation of Fremont, Calif., and CeLight, Inc., of Silver Spring, Md. Additional information on various O/E converters that can be used to implement O/E converter 160 in various embodiments of system 100 are disclosed, e.g., in U.S. Patent Application Publication Nos. 2010/0158521 and 2011/0038631, and International Patent Application No. PCT/US09/37746 (filed on Mar. 20, 2009), all of which are incorporated herein by reference in their entirety.

Each of electrical signals $162_1$-$162_4$ generated by O/E converter 160 is converted into digital form in a corresponding one of ADCs $166_1$-$166_4$. Optionally, each of electrical signals $162_1$-$162_4$ may be amplified in a corresponding amplifier (not explicitly shown) prior to the resulting signal being converted into digital form. Digital signals $168_1$-$168_4$ produced by ADCs $166_1$-$166_4$ are then appropriately processed by a digital signal processor (DSP) 170 to recover, if possible, the data of the original input stream 102 applied to transmitter 110.

DSP 170 is configured to monitor signal distortions imposed by link 140, e.g., based on the signal statistics acquired from the processing of digital signals $168_1$-$168_4$. In one embodiment, based on said monitoring, DSP 170 is configured to identify a constellation that provides optimum performance for the present link conditions and communicate this information, e.g., via a control signal path 174, to DSP 112. Note that, in different embodiments, control signal path 174 may be an optical path, an electrical path, a wireless path, a various combinations thereof. Transmitter 110 and receiver 190 can then employ that particular, new constellation for data transport between them, thereby realizing the concomitant performance advantages/benefits under the present link conditions. If the signal distortions imposed by link 140 change over time, then transmitter 110 and receiver 190 can use control signal path 174 to change the operative constellation in a coordinated manner, as appropriate or necessary for maintaining optimal system-performance characteristics. More details on this particular aspect of the disclosure are provided below in reference to FIG. 3.

Alternatively or in addition, based on the monitoring of signal distortions imposed by link 140, DSP 170 is configured to change boundaries of the decision regions corresponding to the constellation points of the operative constellation to optimally conform them to the present type of signal distortions imposed by the link. Receiver 190 can then employ the changed decision regions to more accurately map the received optical signals onto the operative constellation, thereby lowering the effective BER and/or SER. More details on this particular aspect of the disclosure are provided below in reference to FIGS. 5-6.

In general, DSP 170 is configured to decode the received signal(s) so that each and every possible set of digital values carried by digital signals $168_1$-$168_4$ can be mapped onto one of the constellation points of the operative constellation. Thus, if the constellation has M constellation points, then the vector space corresponding to digital signals $168_1$-$168_4$ is effectively partitioned into M regions, each corresponding to a different one of the M constellation points. These regions are herein referred to as "decision regions."

For example, for a constellation in which a constellation point can be uniquely characterized by an amplitude and a phase, the relevant vector space is a complex plane. In this case, a decision region is a region on a complex plane, wherein, if a vector defined by digital signals $168_1$-$168_4$ falls into a particular decision region, then DSP 170 decodes that particular vector by mapping it onto the constellation point that resides (is located) in that particular decision region. Note that, for some more-complicated constellations, the corresponding decision regions may be more difficult to visualize.

FIGS. 2A-2H graphically show eight representative constellations 210-280 that can be used in various respective configurations of system 100. Each of constellations 210-280 consists of a respective plurality of constellation points arranged on a complex (IQ) plane as indicated in the corresponding figure. Each constellation point or transition between constellation points can be used to encode a respective bit-word, e.g., a binary integer consisting of one or more bits. Various schemes for assigning bit-words to constellation points or transitions are possible. As known in the art, the modulus of a constellation point (e.g., the distance between the constellation point and the origin of the coordinate system) represents the amplitude of the electric field of the corresponding optical symbol. The argument of a constellation point (e.g., the angle between the real axis and the line that connects the constellation point to the origin of the coordinate system) represents the phase of the electric field of the corresponding optical symbol.

Figure 2A:
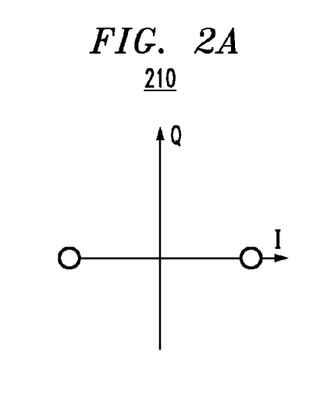
FIGS. 2A-2H graphically show eight representative constellations that can be used in various respective configurations of the optical transport system shown in FIG. 1.

FIG. 2A graphically shows a BPSK (binary phase-shift-keying) constellation 210. Constellation 210 has two constellation points that have the same amplitude but differ in phase by 180 degrees.

Figure 2B:
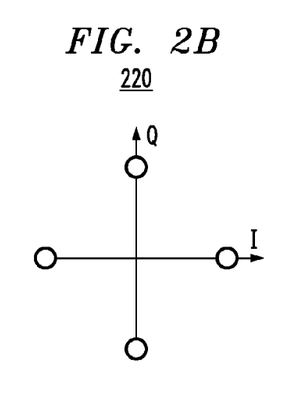

FIG. 2B graphically shows a square 4-QAM (quadrature-amplitude-modulation) constellation 220. Constellation 220 may alternatively be referred to as a QPSK (quadriphase phase-shift-keying) constellation. Constellation 220 has four constellation points of the same amplitude, with two constellation points located on the I-axis and the remaining two constellation points located on the Q-axis.

Figure 2C:
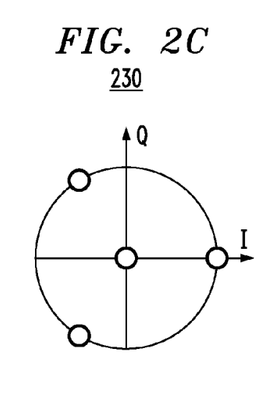

FIG. 2C graphically shows a ring-1-3 constellation 230. Constellation 230 has one of its constellation points at the origin of the complex plane. The remaining three constellation points have the same amplitude (as indicated in the figure by the circle) but pair-wise differ in phase by 120 degrees, also referred to as the phase increment.

Figure 2D:
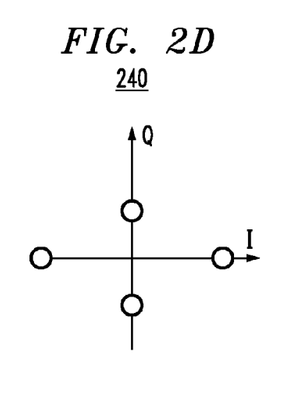

FIG. 2D graphically shows a 2-ASK/2-PSK (amplitude-shift-keying and phase-shift-keying) constellation 240. Constellation 240 has two constellation points on the I-axis and the remaining two constellation points on the Q-axis. Note that the amplitude corresponding to the constellation points located on the I-axis is different from the amplitude corresponding to the constellation points located on the Q-axis.

Figure 2E:
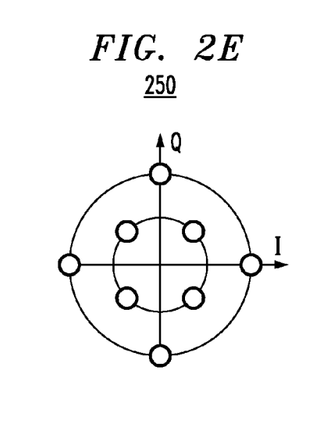

FIG. 2E graphically shows a 2-ASK/4-PSK constellation 250. Constellation 250 is characterized by two different amplitudes, as indicated in the figure by the two corresponding circles. One of the circles has four constellation points, and the other circle has the remaining four constellation points. The constellation points located on the same circle can be generated using a phase increment of 90 degrees. The constellation points located on the outer circle are aligned with the I and Q axes, as indicated in the figure. The constellation points located on the inner circle are aligned with the bisectors (not explicitly shown) of the four quadrants formed by the I and Q axes. Note that constellation 250 may also be referred to as 8-QAM.

Figure 2F:
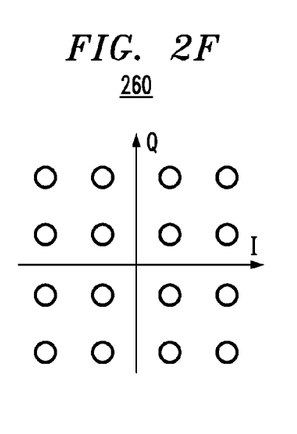

FIG. 2F graphically shows a square 16-QAM constellation 260. Constellation 260 has sixteen constellation points that are arranged in a square grid with equal vertical and horizontal spacing, as indicated in the figure.

Figure 2G:
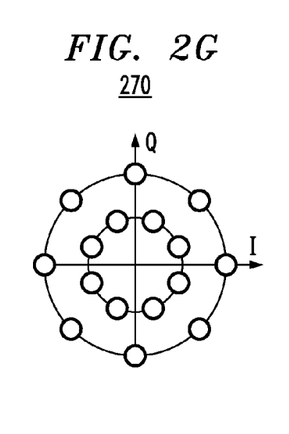

FIG. 2G graphically shows a 2-ASK/8-PSK constellation 270. Constellation 270 is characterized by two different amplitudes, as indicated in the figure by the two corresponding circles. One of the circles has eight constellation points, and the other circle has the remaining eight constellation points. The constellation points located on the same circle are generated using a phase increment of 45 degrees. Four of the constellation points located on the outer circle are aligned with the I and Q axes as indicated in the figure. The phases of the eight constellation points located on the inner circle can be expressed as $22.5° + (n-1) \times 45°$, where $n = 1, 2, \ldots, 8$.

Figure 2H:
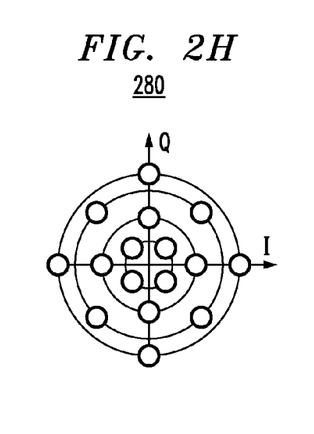

FIG. 2H graphically shows a 4-ASK/4-PSK constellation 280. Constellation 280 is characterized by four different amplitudes, as indicated in the figure by the four corresponding circles. Each of the circles has four constellation points. The constellation points located on the same circle are generated using a phase increment of 90 degrees. The constellation points located on the outer circle and on the second smallest circle are aligned with the I and Q axes as indicated in the figure. The constellation points located on the inner circle and the second largest circle are aligned with the bisectors (not explicitly shown) of the four quadrants formed by the I and Q axes.

One of ordinary skill in the art will appreciate that system 100 can be configured to operate using other constellations in addition to or instead of constellations 210-280. For example, several suitable constellations designed to encode four bits per symbol are disclosed in commonly owned U.S. patent application Ser. No. 13/347,072 (filed on Jan. 10, 2012), which is incorporated herein by reference in its entirety. Constellations of higher (than two) dimensionality, such as polarization-switched QPSK, may also be used.

Referring back to FIG. 1, as already indicated above, system 100 can be configured to adaptively change the operative constellation, e.g., to attain optimal performance characteristics for the present link conditions. In one configuration, a constellation change may include a switch from one preset constellation to another preset constellation, such as from one of constellations 210-280 to another one of constellations 210-280 (see FIG. 2). In another configuration, a constellation change may include iterative modification of the relative positions of constellation points on the complex plane until an optimal constellation-point pattern is found. Control signal path 174 can be used to implement a constellation change in a coordinated manner at both transmitter 110 and receiver 190, e.g., based on the signal processing implemented at DSP 170. To optimize performance characteristics of each constellation, DSP 170 may also be configured to find optimal shapes for the decision regions that are being used in the process of decoding received symbols. In various embodiments, the decision-region adjustment may be either an integral part of the constellation-change process or a separate procedure that is performed after an operative constellation has been selected.

Figure 3:
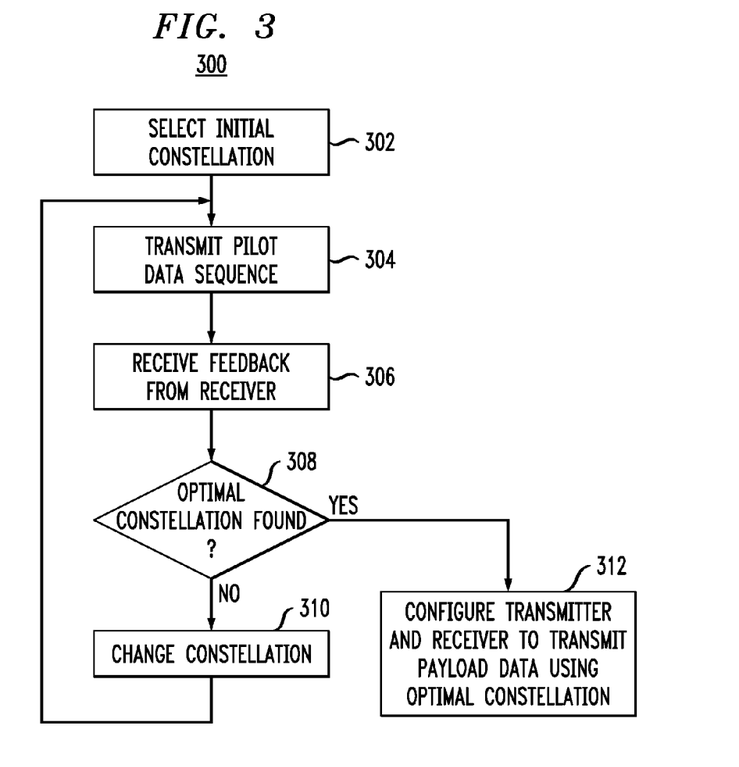
FIG. 3 shows a flowchart of a method of finding an optimal constellation that can be used at the transmitter in the optical transport system shown in FIG. 1 according to one embodiment of the disclosure.

FIG. 3 shows a flowchart of a method 300 that can be used at transmitter 110 for finding an optimal constellation according to one embodiment of the disclosure.

At step 302 of method 300, transmitter 110 selects an initial constellation to be evaluated. For example, for an initial run of method 300, the initial constellation may be randomly selected from a set of constellations saved in the memory, e.g., constellations 210-280 (see FIG. 2). For a non-initial run of method 300, the initial constellation for step 302 may be the optimal constellation that had been determined during a previous run of the method. The execution of method 300 may be initialized through step 302 as often as necessary for maintaining satisfactory performance characteristics of system 100.

At step 304, transmitter 110 transmits to receiver 190 a pilot data sequence that is encoded using the currently operative constellation. If step 304 is performed immediately after step 302, then the currently operative constellation is the initial constellation selected at that step. If step 304 is performed after step 310, then the currently operative constellation is a changed constellation that was selected or generated at that step.

In general, the pilot data sequence transmitted at step 304 can be any suitable data sequence that (i) is known to receiver 190; (ii) properly samples all constellation points of the constellation to be evaluated; and (iii) is sufficiently long to enable the receiver to acquire enough statistics to properly evaluate the relevant system-performance characteristics, e.g., the BER. As appropriate or necessary, different pilot data sequences may be used to test different constellations.

Alternative embodiments of method 300, in which the data sequence transmitted by transmitter 110 at step 304 is not known to receiver 190, are also contemplated. These embodiments may more generally be referred to as "blind" adaptation schemes.

At step 306, transmitter 110 receives a feedback signal from receiver 190 with a set of one or more performance metrics corresponding to the transmission of the pilot data sequence of step 304. In one implementation, the feedback signal might be a part of control signal path 174 (see FIG. 1). One possible performance metric received via the feedback signal can be the BER or SER corresponding to the transmission of the pilot data sequence of step 304. An alternative or additional set of performance metrics may include parameters that describe one or more probability density (PD) functions corresponding to the transmission of the pilot data sequence of step 304. Note that a separate respective PD function may be constructed for each constellation point of the currently operative constellation or a single PD function may be constructed for all constellation points.

As used herein, the term "probability density function" refers to a mathematical function that describes the relative likelihood for the received signal to have a complex value corresponding to a given point on the complex plane. One of ordinary skill in the art will appreciate that a PD function defined on a complex plane is a non-negative two-dimensional function. This function is typically normalized so that its integral over the entire complex plane is equal to one. The probability for the received signal to fall within a particular area on the complex plane is given by the integral of the PD function over that area. The concept of PD function is also applicable to any other multi-dimensional space, e.g., a space corresponding to a constellation that has a dimensionality of higher than two. In the literature, the terms "probability distribution function" and "probability function" are also sometimes used to denote a probability density function, as defined herein.

At step 308, transmitter 110 uses the feedback received from receiver 190 at step 306 to determine whether or not an optimal constellation for the current link conditions has been found. For example, one possible criterion that can be used for this determination might be that the BER observed for the currently operative constellation be smaller than a specified threshold value. Another possible criterion used for this determination might be that a specified number N of different constellations have been tested, e.g., by executing, an appropriate number of times, the processing loop comprising steps 304-310, where N is an integer greater than one. Yet another possible criterion used for this determination might be whether or not the currently operative constellation provides a BER improvement with respect to the constellation that was the operative constellation at the previous instance of step 308. One of ordinary skill in the art will understand that other appropriate criteria may similarly be used for the determination performed at step 308.

If it is determined at step 308 that an optimal constellation has not yet been found, then the processing of method 300 is directed to step 310. If it is determined at step 308 that an optimal constellation has been found, then the processing of method 300 is directed to step 312.

At step 310, transmitter 110 changes the currently operative constellation. As used in the context of step 310, the term "change" encompasses one or both of: (i) replacement of the currently operative constellation by a new one, e.g., selected from a set of constellations saved in the memory, and (ii) modification of the currently operative constellation, e.g., by moving one or more of the constellation points on the complex plane with respect to the origin or each other. After step 310 has been performed, the "changed" constellation becomes a new "currently operative constellation."

In various implementations of step 310, constellation modifications may be performed by, for example: (i) incrementally moving a constellation point in the direction corresponding to a maximum of the gradient of a PD function taken at the current position of the constellation point; (ii) placing a constellation point at a position where the gradient of a PD function is substantially zero in all directions; (iii) moving several constellation points at the same time while preserving a specified symmetry of the constellation; and/or (iv) reversing a previously imposed constellation change. The manner in which the currently operative constellation is modified at step 310 may depend on the feedback received from receiver 190 at step 306. For example, if the previous constellation change resulted in a BER increase, then that change may be reversed and a different type of change may be imposed. The latter change may include, for example, (i) moving the same constellation point in a different direction and/or by a different distance and/or (ii) moving a different constellation point.

At step 312, transmitter 110 and receiver 190 are configured to transmit payload data 102 using the found optimal constellation. As already indicated above, depending on the criteria used at step 308, the optimal constellation might be, for example, the last tested constellation or a constellation that provides a minimum BER among the N last-tested constellations.

Figure 4:
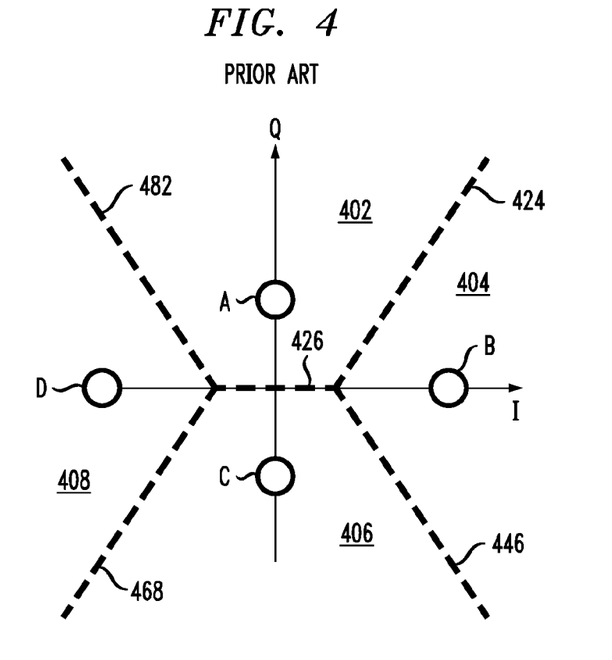
FIG. 4 graphically shows prior-art decision regions corresponding to the constellation shown in FIG. 2D.

FIG. 4 graphically shows prior-art decision regions 402-408 corresponding to constellation 240 (FIG. 2D). When configured to use decision regions 402-408, receiver 190 can decode the received signals, which have been encoded at transmitter 110 using constellation 240, for example, as follows:

If a detected symbol falls within decision region 402, then receiver 190 maps that symbol onto constellation point A and converts it into the bit-word assigned to that point.

If a detected symbol falls within decision region 404, then receiver 190 maps that symbol onto constellation point B and converts it into the bit-word assigned to that point.

If a detected symbol falls within decision region 406, then receiver 190 maps that symbol onto constellation point C and converts it into the bit-word assigned to that point.

If a detected symbol falls within decision region 408, then receiver 190 maps that symbol onto constellation point D and converts it into the bit-word assigned to that point.

If a detected symbol falls directly onto a boundary between two decision regions, then that symbol cannot be unambiguously mapped onto a constellation point, and receiver 190 may treat that symbol as being un-decodable or, alternatively, may randomly choose one of the two constellation points corresponding to the boundary, for an approximately 50% chance of making a correct guess.

Dashed lines 424, 426, 446, 468, and 482 in FIG. 4 demarcate decision regions 402-408. Note that, in the prior art, a detected symbol is generally mapped onto a constellation point that is closest to it in distance on the complex plane. Accordingly, each of boundaries 424, 426, 446, 468, and 482 consists of points on the complex plane that are equidistant from the corresponding two constellation points. For example, boundary 424, which is the boundary between decision regions 402 and 404, consists of points on the complex plane that are equidistant from constellation points A and B. Boundary 426, which is the boundary between decision regions 402 and 406, consists of points on the complex plane that are equidistant from constellation points A and C. Boundary 446, which is the boundary between decision regions 404 and 406, consists of points on the complex plane that are equidistant from constellation points B and C, etc.

When the noise imposed on the optical communication signal in link 140 consists substantially of additive white Gaussian noise (AWGN), decision regions 402-408 enable receiver 190 to achieve good performance characteristics. However, when the noise imposed on the optical communication signal in link 140 includes other types of noise, such as phase noise or nonlinear fiber noise, decision regions 402-408 may no longer enable receiver 190 to perform in a satisfactory manner. Certain embodiments of the disclosure address this particular problem, e.g., as further described below in reference to FIGS. 5-6.

Figure 5:
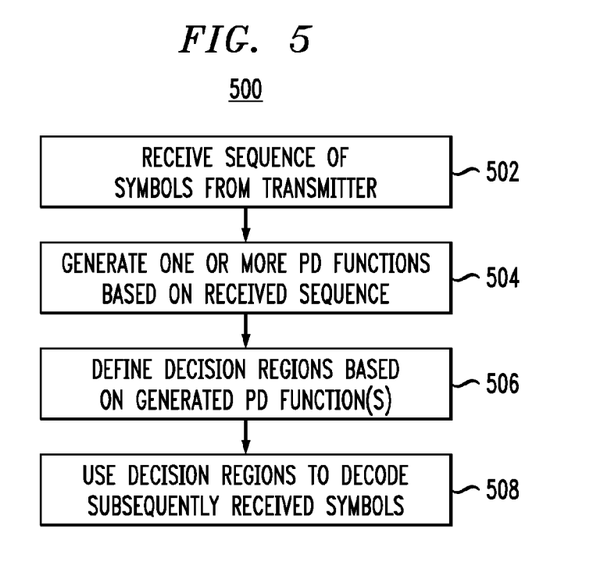
FIG. 5 shows a flowchart of a method of shaping decision regions that can be used at the receiver in the optical transport system shown in FIG. 1 according to one embodiment of the disclosure.

FIG. 5 shows a flowchart of a method 500 that can be used at receiver 190 for shaping decision regions corresponding to a constellation according to one embodiment of the disclosure. The description of method 500 assumes that there are no changes to the currently operative constellation during the processing steps of the method. As already indicated above, in one embodiment, method 500 may be used by receiver 190 to generate a feedback signal for transmitter 100, which feedback signal might be received by the transmitter at step 306 of method 300, and based on which feedback signal the transmitter might change the currently operative constellation at step 310 of method 300.

At step 502 of method 500, receiver 190 receives, via link 140, a sequence of symbols from transmitter 110. In one configuration, the received sequence of symbols might be generated by transmitter 110 based on the pilot data sequence transmitted at step 304 of method 300. In an alternative configuration, the received sequence of symbols might correspond to payload data 102 transmitted by transmitter 110 during a normal operating mode of system 100.

At step 504, DSP 170 processes digital signals $168_1$-$168_4$ corresponding to the sequence of symbols received at step 502 to generate one or more PD functions corresponding to the currently operative constellation. For example, when the sequence of symbols received at step 502 carries a pilot data sequence, DSP 170 knows a priori which constellation symbol has been transmitted in which time slot and, as a result, is able to generate an individual PD function for each constellation point. In contrast, when the sequence of symbols received at step 502 carries payload data 102, DSP 170 does not know a priori which constellation symbol has been transmitted in which time slot and, as a result, is able to generate only a single PD function for the entire constellation. In the latter case, the generated PD function can be a sufficiently accurate approximation of a "true" PD function provided that the payload-data sequence has characteristics that are sufficiently similar to those of a random or pseudo-random data sequence.

At step 506, DSP 170 processes the PD function(s) generated at step 504 to define decision regions for the currently operative constellation. For example, if individual PD functions have been generated for different constellation points during step 504, then DSP 170 may define decision regions by drawing boundaries between them along the lines on which two PD functions corresponding to two different constellation points have equal probability-density values. If a single PD function has been generated during step 504 for the entire constellation, then DSP 170 may define decision regions by drawing boundaries between them using thalwegs of the three-dimensional surface defined by the PD function. More specifically, a boundary between decision regions can be generated by projecting a corresponding thalweg onto the complex plane (which is the base plane of the three-dimensional surface defined by the PD function).

As used herein, the term "thalweg" (or river-flow line) refers to a line drawn on a three-dimensional surface so that (i) it corresponds to a local surface minimum along one direction, e.g., across a hypothetical river stream, from one bank to the opposite bank, and (ii) it tracks said local minimum in the direction of the maximum surface gradient, e.g., the direction along which the hypothetical river stream would flow in the corresponding area of the three-dimensional surface. The term "thalweg" is conventionally used in geography and fluvial geomorphology to denote the deepest continuous inline within a valley or watercourse system. A thalweg thus marks the natural path of a watercourse in a landscape. Since the geometrical shape of a thalweg is determined primarily by the topology of the corresponding landscape, a thalweg can also be determined, as an abstract geometrical construct having the above-indicated mathematical properties, for any surface, including a surface defined by an analytical or numerical function, such as a PD function.

At step 508, DSP 170 uses the decision regions defined at step 506 to decode the subsequently received symbols, e.g., symbols carrying payload data or additional pilot data. While decoding the subsequently received symbols, DSP 170 may also determine the BER, SER, and/or other pertinent performance metrics, which can then be used for generating appropriate feedback to transmitter 110 (see step 306 in FIG. 3).

Method 500 may be repeated as often as necessary for maintaining satisfactory performance characteristics of receiver 190 and/or system 100.

In one configuration of receiver 190, the shapes of the decision regions determined using various runs of method 500 for different sets of values of the relevant system parameters, such as constellation type, link conditions, signal power, optical-signal-to-noise ratio (OSNR), fiber type, wavelength of operation, etc., may be saved in a memory for future use. Then, at a later time, instead of executing method 500, receiver 190 may retrieve from the memory the saved shapes (if any) corresponding to the current values of system parameters and use the retrieved shapes for signal decoding.

Although the concept of adaptive decision regions has been described above in reference to a two-dimensional constellation, such as any one of constellations 210-280 (FIG. 2), the concept is not so limited. From the provided description, one of ordinary skill in the art will be able to apply the concept of adaptive decision regions to constellations having a dimensionality of greater than two.

Figure 6A:
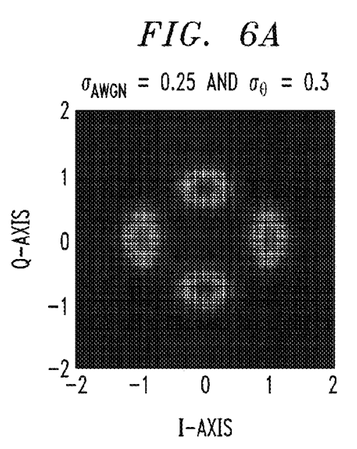
FIGS. 6A-6F graphically illustrate representative results obtained using the method shown in FIG. 5.
Figure 6B:
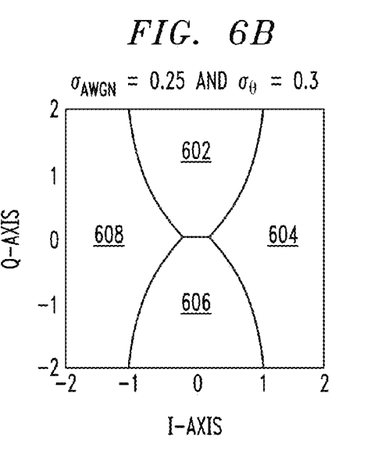
Figure 6C:
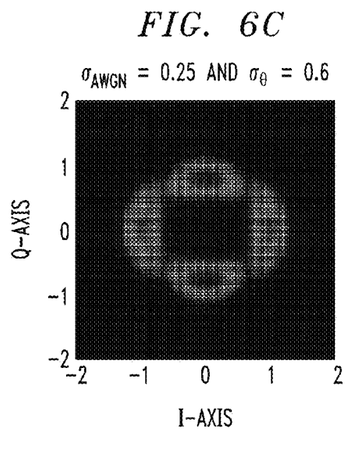
Figure 6D:
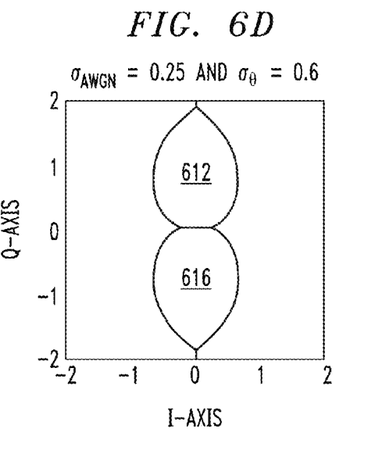
Figure 6E:
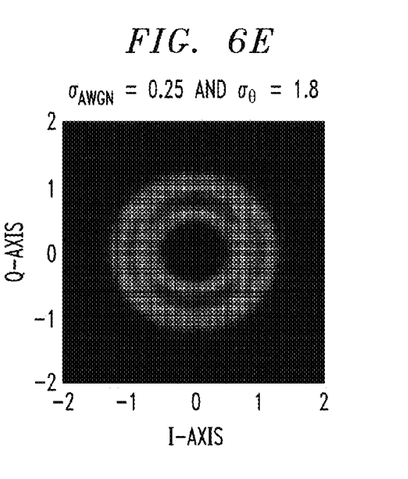
Figure 6F:
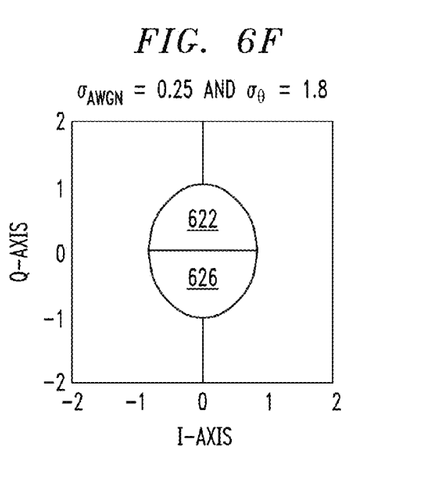

FIGS. 6A-6F graphically illustrate representative results obtained using method 500 (FIG. 5). More specifically, the data shown in FIGS. 6A-6F correspond to constellation 240 (FIG. 2D) having the following four constellation points (expressed as complex numbers): +1; +0.8 j; −1; and −0.8 j. The noise in the system has two components: AWGN and phase noise. The level of AWGN is the same for all figures and corresponds to a standard deviation value of $\sigma_{AWGN}$=0.25. The level of phase noise, quantified in terms of its standard deviation $\sigma_\theta$, varies as follows: (i) $\sigma_\theta$=0.3 for the data shown in FIGS. 6A-6B; (ii) $\sigma_\theta$=0.6 for the data shown in FIGS. 6C-6D; and (iii) $\sigma_\theta$=1.8 for the data shown in FIGS. 6E-6F. Each of FIGS. 6A, 6C, and 6E shows a PD function generated at step 504 of method 500 for the link conditions characterized by the indicated levels of AWGN and phase-noise. Each PD function is depicted using a color scheme in which the function's magnitude decreases from the red color to the blue color in a rainbow-like color progression. Each of FIGS. 6B, 6D, and 6F shows the decision regions defined at step 506 of method 500 based on the respective PD function. It may also be instructive to compare the decision regions shown in each of FIGS. 6B, 6D, and 6F with the prior-art decision regions shown in FIG. 4.

The data shown in FIGS. 6A and 6B correspond to a relatively low level of phase noise. As a result, the PD function of FIG. 6A has four relatively well-separated humps (seen as multi-colored spots in FIG. 6A), each corresponding to a respective constellation point of constellation 240. The presence of phase noise however causes the shape of each hump to be slightly asymmetric, e.g., elongated in the azimuthal direction compared to the radial direction, where the terms "azimuthal" and "radial" refer to the position with respect to the origin of the complex plane in a polar coordinate system. The azimuthal hump distortion causes the corresponding decision regions in FIG. 6B to differ in shape from the prior-art decision regions shown in FIG. 4. For example, the boundary between decision regions 602 and 604 in FIG. 6B has a curved shape, whereas boundary 424 between decision regions 402 and 404 in FIG. 4 is a straight line. Similarly, the boundary between decision regions 606 and 608 in FIG. 6B also has a curved shape, whereas boundary 468 between decision regions 406 and 406 in FIG. 4 is a straight line.

The data shown in FIGS. 6C and 6D correspond to an intermediate level of phase noise. While the PD function of FIG. 6C still has four relatively well-separated humps, the phase noise causes each of the humps to become even more elongated in the azimuthal direction compared to the radial direction. This larger azimuthal distortion causes each of decision regions 612 and 616 (FIG. 6D), which correspond to the constellation points located at +0.8 j and −0.8 j, respectively, to have a closed shape. In contrast, each of the corresponding prior-art decision regions 402 and 406 (FIG. 4), which correspond to constellation points A and C, respectively, has an open shape.

The data shown in FIGS. 6E and 6F correspond to a relatively high level of phase noise. This relatively strong phase noise causes the four humps of the PD function shown in FIG. 6E to almost merge together and form a shape that resembles an oval donut, with the long axis of the oval being parallel to the I-axis. Note also that there are depressions across the donut rim that are approximately parallel to the Q-axis and are located at about the I-coordinate values of +0.7 and −0.7. This shape of the PD function causes decision regions 622 and 626 (FIG. 6E), which correspond to the constellation points located at +0.8 j and −0.8 j, respectively, to jointly form an oval-like shape, with the long axis of the oval being parallel to the Q-axis.

Comparison of the decision regions shown in FIGS. 6B, 6D, and 6F indicates that the SER may significantly increase if an incorrect configuration of the decision regions is used for signal decoding at receiver 190 and that an appropriate adjustment of said configuration is beneficial when the noise composition and/or type change(s) in system 100. The results shown in FIGS. 6B, 6D, and 6F also indicate that the use of the prior-art decision regions shown in FIG. 4 for all link conditions may be detrimental to the performance characteristics of system 100.

Analyses of the various decision regions shown in FIGS. 6B, 6D, and 6F reveal that at least some of them have the following property: the decision region corresponding to a first selected constellation point includes areas that are closer in distance on the complex plane to a different constellation point than to that first selected constellation point. In contrast, none of prior-art decision regions 402-408 (FIG. 4) have this property because they are constructed to always have a shorter distance to the resident constellation point than to a non-resident one.

While this invention has been described with reference to illustrative embodiments, this description is not intended to be construed in a limiting sense.

As used in the claims, the term "distance" should be construed to encompass (i) a Euclidean distance between two points in a multidimensional space, such as a complex plane, and (ii) other types of distance between two points in a multidimensional space, such as, without limitation, a Mahalanobis distance, a Minkowski distance, a Manhattan distance, and a Chebyshev distance.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical receiver configured to decode an optical input signal using a constellation, wherein:
    the constellation comprises at least a first constellation point and a second constellation point;
    the optical receiver is further configured to:
        decode a symbol received via the optical input signal using the first constellation point if the symbol falls within a first decision region;
        decode a symbol received via the optical input signal using the second constellation point if the symbol falls within a second decision region;
        measure a probability density function corresponding to the constellation based on a sequence of symbols received via the optical input signal; and
        define a shape of at least one of the first and second decision regions based on a thalweg of the probability density function; and
    the first decision region includes an area that is closer in distance to the second constellation point than to the first constellation point.

2. The apparatus of claim 1, wherein the second decision region includes an area that is closer in distance to the first constellation point than to the second constellation point.

3. The apparatus of claim 1, wherein the optical receiver is further configured to adaptively change a shape of at least one of the first and second decision regions based on detected changes in input-signal distortions.

4. An apparatus comprising an optical receiver configured to:
    decode symbols received via an optical input signal using a plurality of decision regions corresponding to a plurality of constellation points of a first constellation, wherein a received symbol is decoded using a first constellation point of the first constellation if the symbol falls within a decision region corresponding to the first constellation point;
    measure a probability density function corresponding to the first constellation based on a sequence of symbols received via the optical input signal;
    change a shape of at least one of the plurality of the decision regions based on the probability density function; and
    define the shape of the at least one of the decision regions based on a thalweg of the probability density function.

5. The apparatus of claim 4, wherein the optical receiver is further configured to decode symbols received via the optical input signal using a decision region having a shape that has been changed.

6. The apparatus of claim 4, wherein the optical receiver is further configured to change the shape of at least one of the decision regions based on detected changes in input-signal distortions.

7. The apparatus of claim 4, wherein said sequence of symbols carries payload data.

8. The apparatus of claim 4, wherein said sequence of symbols is a pilot sequence.

9. The apparatus of claim 4, wherein the optical receiver is further configured to generate a feedback signal for an optical transmitter that caused the optical receiver to receive the optical input signal, said feedback signal having one or more performance metrics that characterize signal transmission from the optical transmitter to the optical receiver.

10. The apparatus of claim 9, wherein the one or more performance metrics include a bit-error rate or a symbol-error rate corresponding to the optical input signal.

11. The apparatus of claim 9, further comprising the optical transmitter, wherein the optical transmitter is configured to change the first constellation based on the feedback signal.

12. The apparatus of claim 11, wherein the optical transmitter is configured to change the first constellation by replacing it by a second constellation retrieved from a memory.

13. The apparatus of claim 11, wherein the optical transmitter is configured to change the first constellation by moving one or more of the constellation points with respect to each other.

* * * * *